N. R. STEWART.
AIR INTAKE FOR COMBUSTION ENGINES.
APPLICATION FILED SEPT. 30, 1920.
1,410,846.
Patented Mar. 28, 1922.
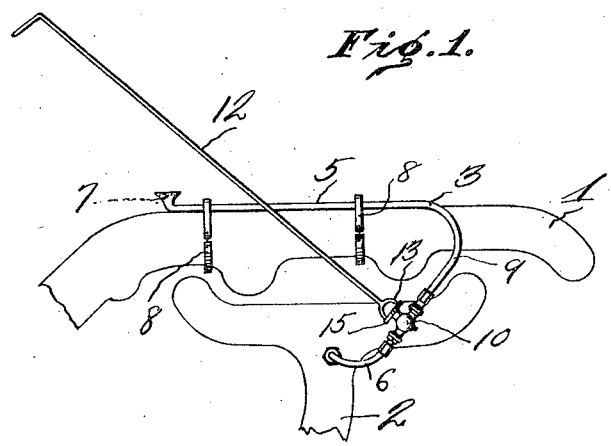
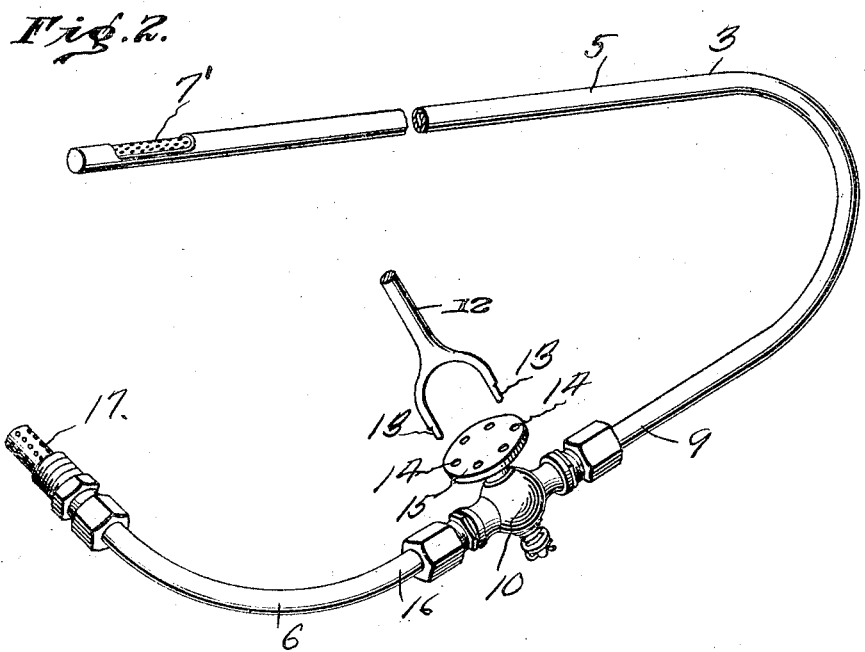
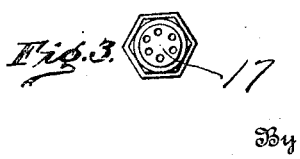
Inventor
N. R. Stewart
By D. Swift
Attorney

UNITED STATES PATENT OFFICE.

NOBLE R. STEWART, OF SANTA MARIA, CALIFORNIA.

AIR INTAKE FOR COMBUSTION ENGINES.

1,410,846.  Specification of Letters Patent.  Patented Mar. 28, 1922.

Application filed September 30, 1920. Serial No. 413,795.

*To all whom it may concern:*

Be it known that I, NOBLE ROLAND STEWART, a citizen of the United States, residing at Santa Maria, in the county of Santa Barbara, State of California, have invented a new and useful Air Intake for Combustion Engines; and I do hereby declare the following to be a full, clear, and exact description of the invention, such as will enable others skilled in the art to which it appertains to make and use the same.

The invention relates to devices for furnishing additional air which has been preheated, to the intake manifold of an internal combustion engine for volatilizing the charge before it enters the engine cylinder. It has been found that where additional air is furnished, which air is preheated that the results obtained from the fuel are increased as to power and mileage from a given amount of fuel.

A further object is to provide an additional air supply device for an internal combustion engine, said device comprising a flexible pipe, one end of which is provided with a perforated screening member adapted to be threaded into the intake manifold, and the other end of said pipe being adapted to be secured and held on the exhaust manifold of the engine and provided with a screening member, through which member the air is sucked and screened and heated as it passes through a portion of the pipe which contacts with the exhaust manifold before entering the intake manifold. A further object is to provide a valve intermediate the ends of the pipe and controllable from a distance, by means of which valve the amount of air admitted to the intake manifold may be controlled.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the device showing the same applied to the exhaust and intake manifold.

Figure 2 is a perspective view of the device showing the modified form of intake end.

Figure 3 is an end view of a discharge end of the device.

Referring to the drawings, the numeral 1 designates the exhaust manifold of an internal combustion engine and 2 the intake manifold. The preheated air supplying device 3 comprises the pipe sections 5 and 6. One end of the pipe section 5 is provided with straining member 7 through which air is sucked and strained during the operation of the engine. Pipe section 5 is held in engagement with the exhaust manifold 1 by means of clamps 8 so that said section will be heated and the air will also be heated as it passes through the pipe 5. The end 9 is secured to a valve 10 so that the amount of air allowed to pass through the pipe 5 may be controlled by means of an operating rod 12 having fingers 13 which are received by diametrically disposed apertures 14 in the valve wheel 15. By means of the rod 12 the valve 10 may be controlled from a remote point, such for instance as adjacent the steering wheel. Connected to the valve 10 is the end 16 of the pipe section 6, pipe section 6 being provided with a strainer member 17, which is threaded into the intake manifold 2 at a point between the carbureter and the intake ports of the engine.

By providing additional air which air is preheated and mixed with the charge before it enters the cylinder it has been found that the charge is volatilized and that greater power is obtained from the explosion and also a greater mileage may be obtained from a gallon of gasoline than if the device were not used.

The pipe sections 5 and 6 are preferably made from a flexible material so that the device may be easily and quickly applied to various types of engines.

From the above it will be seen that a device is provided for admitting preheated air to the charge of an internal combustion engine, which device is simple in construction and one which may be easily and quickly applied to various types of engine.

The invention having been set forth what is claimed as new and useful is:—

A charge preheating device for internal combustion engines, said device comprising a pipe, one end of said pipe being provided with a strainer extending into the intake manifold, said pipe extending forwardly upwardly and rearwardly the rearwardly extending portion of the pipe being secured to the exhaust manifold, a valve carried by the upwardly extending portion of the pipe and provided with a rearwardly disposed apertured operating disc, a rearwardly and upwardly extending operating rod, said operating rod being detachably connected to the apertured disc, said forwardly, upwardly and rearwardly extending pipe forwardly of its securing points being provided with sufficient slack to allow the valve to be positioned at various angles by bending the pipe, thereby allowing the operating rod to be positioned at various rearwardly extending angles according to the type of automobile engine to which the device is applied.

In testimony whereof I have signed my name to this specification in the presence of two subscribing witnesses.

NOBLE R. STEWART.

Witnesses:
 A. B. BIGLEE,
 H. O. WILLIAMS.